Aug. 21, 1956   J. K. SCHAEFER   2,760,178
BATTERY CONNECTOR FOR STORAGE BATTERIES
Filed Aug. 9, 1954   2 Sheets-Sheet 2
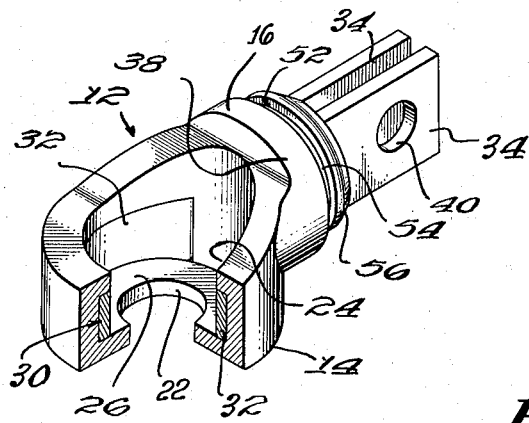
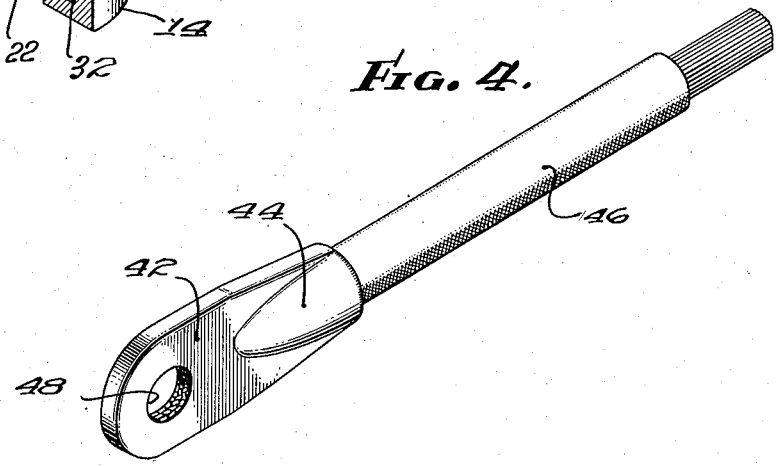
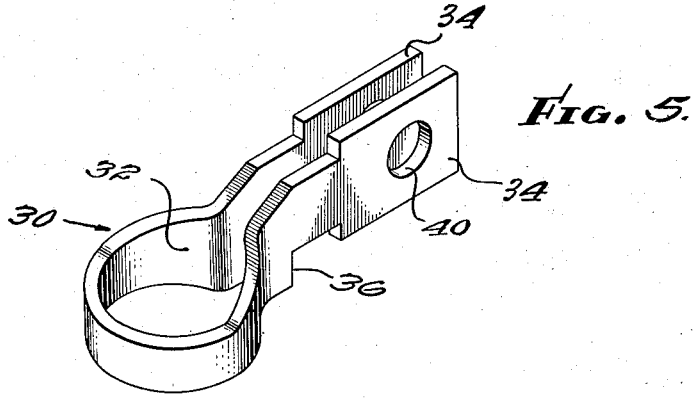
INVENTOR.
JOSEPH K. SCHAEFER,
BY
Thomas P. Mahoney.
ATTORNEY.

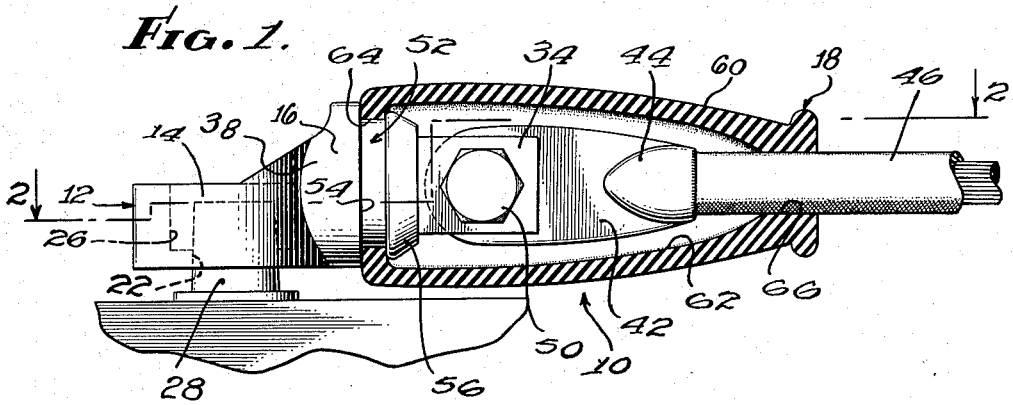

United States Patent Office 2,760,178
Patented Aug. 21, 1956

2,760,178
BATTERY CONNECTOR FOR STORAGE BATTERIES

Joseph K. Schaefer, Hollywood, Calif.

Application August 9, 1954, Serial No. 448,511

4 Claims. (Cl. 339—275)

This invention relates to battery connectors and, more particularly, to battery connectors of the permanent type which are adapted to be permanently secured to the post of a battery. It is well known to those skilled in the art that one of the major factors resulting in the ultimate failure of batteries is the utilization of conventional split clamps of various types since the repeated removal and reinstallation of such conventional clamps place undue loads upon the posts which result in fracture of the battery casing and damage to the separators and other constituent elements of the battery. Furthermore, the posts themselves are loosened and the electrical contact established thereby rendered ineffective.

In addition, the frequent removal and reinstallation of conventional clamps from and upon battery posts results in both distortion of the posts and the clamps and the unskilled persons who accomplish such removal and reinstallation of conventional clamps do not properly reinstall the clamps upon the posts. As a matter of fact, such damage is done to both posts and clamps that effective electrical contact seldom exists after one or two removals of the battery for servicing.

In addition, it is well known that one of the major problems encountered in battery and conductor life of conductors associated with such batteries is the exposure to acid deposits emanating from the battery. Such acid deposits corrode both the clamps and the conductors associated therewith and necessitate frequent renewal of the clamps and said conductors.

It is, therefore, an object of my invention to provide a permanent battery connector which is designed to be permanently fixed upon a battery post and which can be interchangeably utilized in conjunction with either the positive or negative post of a battery.

An additional object of my invention is the provision of a battery connector of the aforementioned type which includes a connector body having a bore for the reception of an intermediate portion of the post and a unitary electrode mounted in said body and having a conductive surface disposed immediately adjacent the wall of the bore to provide maximum conductivity through the body.

An additional object of my invention is the provision of a connector of the aforementioned character wherein the unitary electrode is constituted by a highly conductive material such as brass so that excellent conductivity characteristics are obtained through the connector of my invention.

A further object of my invention is the provision of a unitary electrode of the aforementioned character which includes a substantially cylindrical portion located in the connector portion of the connector body and a pair of laterally spaced arms extending through an extension constituting an integral portion of said body.

A further object of my invention is the provision of a unitary electrode of the aforementioned character which includes a substantially cylindrical portion located in the connector portion of the connector body and a pair of laterally spaced arms extending through an extension constituting an integral portion of said body, the connector incorporating said electrode being designed to effectively utilize the center-formed lug on an associated battery cable. This is of utmost importance since the center-formed lug has been adopted by the cable industry to provide maximum conductivity in a unit of the lowest possible cost.

A further object of my invention is the provision of a battery connector of the aforementioned character wherein the unitary electrode is formed of highly conductive material and wherein the body of the connector and the extension formed integrally therewith may be fabricated from more or less conductive material, depending upon the particular application for which the connector is being fabricated. For instance, a non-metallic material might be utilized in a connector body for aircraft batteries where weight is a factor, or a material of low electrical conductivity but of high anti-corrosive value and low cost such as lead may be used.

As previously indicated, the corrosion problem is a major factor in battery cable and connector life and it is an additional object of my invention to provide a connector which has an extension formed thereupon for the reception of one end of a resilient protective sheath which defines an isolating chamber for the reception of the spaced ends of the arms of the unitary electrode and the fitting on the end of the conductor cable.

Another object of my invention is the provision of an installation tool to facilitate the permanent affixation of connectors constructed in accordance with my invention upon a battery post, said tool eliminating the element of skill in such installation and generally facilitating the creation of a conductive bond between the battery post and the electro-conductive unitary electrode mounted in the connector body.

A further object of my invention is the provision of a method of mounting a connector constructed in accordance with my invention upon a battery post which includes the steps of applying heat to juxtaposed walls of both the connector and the battery post to partially soften the metal constituting the same and subsequently infusing into the space between said walls a securement material such as solder which renders the connector body a unitary part of the battery post and, at the same time, establishes maximum electrical conductivity between the unitary electrode mounted in the body of the connector and the battery post.

Other objects and advantages of my invention will be apparent from the following specification and the accompanying drawings which are for the purpose of illustration only and in which:

Fig. 1 is a partly sectional view of a permanent battery connector constructed in accordance with my invention;

Fig. 2 is a transverse sectional view taken on the broken line 2—2 of Fig. 1;

Fig. 3 is a perspective, partly broken view of the connector body constituting a part of my invention;

Fig. 4 is a view of an end of a battery cable having a conventional attachment lug secured thereupon;

Fig. 5 is an enlarged, perspective view of the unitary electrode to be mounted in the connector body of the battery connector of my invention;

Fig. 6 is an end view showing the configuration assumed by the end of the non-conductive sheath constituting a part of the battery connector of my invention as it is being installed over the center formed lug on the battery cable; and Fig. 7 is a partly sectional view of the installation tool utilized in installing the battery connector of my invention upon a battery post.

Referring to the drawings, and particularly to Figs. 1-2 thereof, I show a battery connector 10 constructed in accordance with my invention and including a connector body 12 having a substantially cylindrical body portion 14 provided with an integral extension 16.

Operatively associated with the connector body 12 is a non-conductive housing 18. The connector body 12 and, more particularly, the body portion 14 thereof, includes a bore 22 whose diameter is substantially equivalent to that of an intermediate portion of an associated battery post, as best shown in Fig. 1 of the drawings, and which communicates at its upper end with a counterbore 24 having an interior wall 26 disposed in spaced relationship with the periphery of the upper portion of the associated battery post 28.

The walls of the bore 22 are slightly tapered to conform to the taper of the battery post 28 and to provide an adequate seal therebetween since the counterbore 24 and, more particularly, the space defined between the interior wall 26 thereof and the periphery of the upper portion of the post 28 is intended to serve as a receptacle for the securement material which will be fed into said space, in a manner to be described in greater detail below, to permanently affix the body portion of the connector body to the battery post 28. Although the connector body 12 can be fabricated from conductive or non-conductive materials, in the present instance the connector body is formed from lead in accordance with conventional practices.

Cast into the connector body 12 simultaneously with the formation thereof is a unitary electrode or contact member 30, best shown in Figs. 2-3, 5 of the drawings, and including a substantially cylindrical body portion 32 having integrally formed therewith a laterally extending pair of attachment arms 34.

The inner wall of the body portion 32 of the unitary electrode 30 is disposed in flush relationship with the inner wall 26 of the counterbore 24 to place the unitary electrode 30 in as close juxtaposition to the battery post 28 as is possible. Although the unitary electrode 30 may be formed from any one of a wide variety of highly conductive materials, I have found that brass is the most suitable material for my purposes.

The unitary electrode 30, as best shown in Fig. 5 of the drawings, includes keys 36 formed in the laterally extending attachment arms 34 and said attachment arms extend laterally through an integral, substantially cylindrical extension 38 formed on the body portion 14 of the connector body 12. The outermost ends of the attachment arms 34 are provided with juxtaposed openings 40 and are disposed in spaced relationship with each other to receive the center formed lug provided on a cable fitting 44 secured to the end of a battery cable 46. The center formed lug 42 is provided with the centrally located openings 48 which is disposed in registry with the openings 40 in the attachment arms 34 for the reception of a bolt and nut combination 50 which secures the fitting 44 in conductive relationship with the arms 34.

Formed integrally upon the extension 38 is fastening means 52 for the non-conductive housing 18, said fastening means being constituted by an annular groove 54, as best shown in Figs. 1, 2, and 3 of the drawings, said annular groove having a wedge-shaped annulus 56 formed integrally with said extension adjacent the outermost end thereof. The fastening means 52 is designed to secure the forward end of the non-conductive housing 18 in operative relationship with the connector body 12 and to this end the outward wall of groove 65 acts as a shoulder to retain housing 18 in position. The non-conductive housing 18 is constituted by an elongated sheath 60 which, as best shown in Fig. 1 of the drawings, defines an isolating chamber 62 and is provided with an opening 64 at its forward end of smaller diameter than said chamber and an opening 66 at its rearward end for the reception of the periphery of the conductor 46.

The opening 64 at the forward end of the elongated sheath 60 is disposed in operative relationship with the annular groove 54 by urging the opening 64 over the wedge-shaped annulus 56 to expand the same and subsequently allowing the forward end of the sheath 60 to contract into sealing engagement with the annular groove 54. Therefore, an airtight seal is established between the extension of the connector body 12 and the forward end of the elongated sheath 60. The rearward end of the sheath 60 has its opening disposed in sealing relationship with the periphery of the conductor cable 46 and is fitted over said cable by pushing the opening 66 over the center formed lug 42 on the cable fitting 44 in the manner shown in Fig. 6 of the drawings.

When both of the openings 64 and 66 are respectively disposed in operative relationship with the fastening means 52 and the periphery of the battery cable 46, the isolating chamber is sealed from contact by ambient air loaded with gas and acid fumes from the battery. Therefore, the laterally extending attachment arms 34 of the battery connector 10, the bolt and nut connection 50, and the battery cable fitting 44 are isolated from the deleterious and corrosive effects of the battery fumes in the isolating chamber 62.

When the necessity for removal of the cable fitting 44 and, more particularly, the center formed lug 42 thereof from operative relationship with the attachment arms 34 of the battery connector 10 arises, the forward end of the elongated sheath 60 is disengaged from the annular groove 54 by sliding the elongated sheath 60 rearwardly on the battery cable 46 to expose the attachment arms 34, the bolt and nut combination 50, and the cable fitting 44.

Since these elements are completely isolated by the provision of the isolating chamber 62 within the elongated sheath 60, they can be readily disconnected without the necessity for the application of undue pressure which would possibly distort the component parts thereof. Furthermore, there is absolutely no necessity for placing an undue load upon the battery post 28 since the connector body 12 is permanently secured thereto in a manner which will be described in greater detail below.

Since, as previously indicated, the connector body 12 of the battery connector 10 is interchangeably mountable upon either the negative or positive post of a battery, when it is desired to permanently attach the connector body 12 upon the post 28 it is fitted securely about the intermediate portion of said post in a position in which the bore 22 snugly fits against the tapered periphery of said post because of the slight taper of the wall defining said bore. If the connector 10 is being installed by skilled personnel, it may be possible for such personnel to merely feed solder or similar conductive material in molten condition into the space between the inner wall 26 of the counterbore 24 and the periphery of the post 28. However, in order to facilitate the proper securement of the battery connector 10 to the post 28 I provide an installation tool 70, shown in Fig. 7 of the drawings, whereby the connector 10 may be quickly and efficiently installed upon the battery post 28.

The installation tool 70 is provided with a right-angularly oriented shank 72 having a reduced end 74 formed thereupon for insertion into a pressurized gas heating torch or an electrically heated torch, not shown, so that the shank may serve as a heat conductor for carrying the heat generated by the torch to the head 76 of the tool 70. The head 76 is of substantially cylindrical configuration and is provided with a well 78 in its uppermost end for the reception of solder which is melted by contact with the heated head 76 and which flows downwardly from the well through a passage 80 into a bore 82 whose inner wall 84 is slightly tapered to conform to the taper of the battery post 28 which enters the bore 82 during the installation operation.

The thickness of the wall defining the bore 82 is substantially equivalent to the width of the space between the periphery of the battery post 28 and the interior wall 26 of the counterbore 24 in the connector body 12 so that said wall may be urged downwardly into the space between said periphery of said battery post and said interior wall.

When it is desired to install the battery connector 10 upon the post 28 by the utilization of the installation tool 70, the tool 70 is mounted in a torch to bring the head 76 of the tool 70 to the proper temperature for melting solder or similar conductive material. The tool is then inserted into the space between the wall 26 of the counterbore and the periphery of the battery post 28 and the upper portion of the battery post 28 enters the bore 82 while the lower end 86 is disposed contiguously into the bottom of the counterbore 24. The molten solder or lead is then flowed through the passage 80 into the bore 82 and thence into the space between the wall of the counterbore 24 and the periphery of the post 28, the tool being continuously rotated and vertically reciprocated to tamp and adequately distribute the molten metal in the space between said counterbore wall and the periphery of said battery post.

A vent opening 88 is provided in the wall 84 of the bore 82 to permit entrapped air and gas to pass to atmosphere and to eliminate bubble and porosity formations in the molten metal. The action of the tool 70 is continued until the molten metal is flush with the flat top portion of the connector body 12 and covers the upper end of the battery post 28.

It is, therefore, obvious that the utilization of the tool 70 by applying the heated cylindrical head 76 of the tool 70 to the periphery of the battery post 28 and the interior wall of the counterbore 24 slightly melts both the interior of the counterbore 24 and the periphery of the post 28 to create a more effective bond between the interior wall of the counterbore 24 and the periphery of the post 28 with the molten material subsequently fed into the space between the wall of the counterbore 24 and the post 28.

After the metal has cooled, the installation of the battery cable 46 and the isolating non-conductive housing 18 on the connector body 12 may be accomplished.

It is, therefore, obvious that I provide by my invention a battery connector which is characterized by maximum conductivity of the current from the battery to the battery cable since the unitary electrode inserted in the connector body of the connector is disposed in as close proximity to the battery post as is possible without, in any way, distorting or moving the component parts of the electrode.

Furthermore, I provide an installation tool which facilitates the permanent affixation of the connector body to the battery post and a method of installation which insures that by prior melting of the periphery of the post and the interior of the connector body a homogeneous and continuous bond will be established between the connector body and the periphery of the post and the deposit of molten metal infused into the space between the periphery of the post and the wall of the counterbore in the connector body.

I claim as my invention:

1. In a battery connector for permanent connection to a battery post, a connector body having a bore therethrough restricted at one end for receiving and engaging an intermediate portion of said post, said bore serving as a receptacle for solder to secure said body permanently to said post, a right-angularly oriented extension formed integrally with said body, and a unitary contact member mounted in said body including a substantially cylindrical portion looped around said bore and forming a wall thereof, and a portion of said contact member extending laterally through and beyond said extension for connection to the end of a conductor so as to provide a direct current path from said conductor through said contact member to said solder and thence to said post.

2. A battery connector as set forth in claim 1 wherein said portion of said contact member extending through and beyond said extension comprises a pair of substantially parallel arms adapted to engage said conductor.

3. A battery connector as set forth in claim 1 wherein said extension is provided with a shoulder intermediate the ends thereof for receiving one end of a resilient sheath having its other end overlying said conductor to seal the connection between said contact member and said conductor from said post and connector body.

4. A battery connector as set forth in claim 3 wherein said shoulder comprises one wall of an annular groove about said extension.

References Cited in the file of this patent

UNITED STATES PATENTS

| | | |
|---|---|---|
| 994,744 | Hall | June 13, 1911 |
| 1,225,298 | Willard | May 8, 1917 |
| 1,420,435 | Marko | June 20, 1922 |
| 2,003,053 | Pavlovic | May 28, 1935 |
| 2,269,455 | Hagemeyer | Jan. 13, 1942 |
| 2,461,112 | Foster | Feb. 8, 1949 |
| 2,531,308 | Thomas | Nov. 21, 1950 |
| 2,610,390 | Locke | Sept. 16, 1952 |